(12) United States Patent
Bennett

(10) Patent No.: US 7,708,509 B1
(45) Date of Patent: May 4, 2010

(54) LOCKING RETAINER FOR THREADED FASTENERS

(76) Inventor: Bruce A. Bennett, 15 Chestnut Ave., San Rafael, CA (US) 94901

( * ) Notice: Subject to any disclaimer, the term of this patent is extended or adjusted under 35 U.S.C. 154(b) by 0 days.

(21) Appl. No.: 12/463,034

(22) Filed: May 8, 2009

(51) Int. Cl.
*F16B 39/10* (2006.01)

(52) U.S. Cl. .................... 411/95; 411/119; 411/120; 411/121; 411/122; 411/166; 411/197; 411/198; 411/199

(58) Field of Classification Search ............ 411/92, 411/93, 95–97, 102, 109, 112, 119–122, 411/166, 197–199; 81/119–121.1; 403/11, 403/21, 22; 24/703.1
See application file for complete search history.

(56) References Cited

U.S. PATENT DOCUMENTS

| 981,284 A | 1/1911 | Lamb | |
|---|---|---|---|
| 1,113,344 A | 10/1914 | Hodges | |
| 1,150,362 A | * 8/1915 | Hascall | 411/198 |
| RE15,379 E | * 6/1922 | Bechberger | 411/201 |
| 1,427,566 A | * 8/1922 | Wear et al. | 411/90 |
| 1,562,907 A | 11/1925 | Morgan | |
| 2,337,368 A | * 12/1943 | Bohler | 81/185 |
| 2,352,400 A | 6/1944 | Nystrom et al. | |
| 2,400,318 A | * 5/1946 | Rosan | 411/373 |
| 2,550,867 A | * 5/1951 | Rosan | 411/116 |
| 2,620,743 A | 12/1952 | Taylor | |
| 3,022,809 A | * 2/1962 | Kottsieper | 411/197 |
| 3,141,487 A | * 7/1964 | Boyd | 411/105 |
| 3,182,543 A | * 5/1965 | Shiokawa | 83/573 |
| 3,354,757 A | * 11/1967 | Grimm et al. | 81/176.1 |
| 3,523,709 A | 8/1970 | Heggy et al. | |
| 3,569,695 A | 3/1971 | McLean | |
| 3,623,761 A | 11/1971 | Nadherny | |
| 3,713,686 A | * 1/1973 | Eddy et al. | 295/42.2 |
| 3,727,969 A | * 4/1973 | Eddy et al. | 295/42.2 |
| 3,741,603 A | * 6/1973 | McLean, Jr. | 295/42.2 |
| 3,926,237 A | * 12/1975 | Enders | 411/135 |
| 4,015,874 A | 4/1977 | Hennessy | |
| 4,734,001 A | 3/1988 | Bennett | |
| 4,906,150 A | 3/1990 | Bennett | |
| 5,013,076 A | 5/1991 | Robertson | |
| 5,395,192 A | 3/1995 | Bennett | |
| 5,618,143 A | * 4/1997 | Cronin et al. | 411/220 |
| 5,674,034 A | 10/1997 | Bennett | |

(Continued)

*Primary Examiner*—Victor Batson
*Assistant Examiner*—Roberta Delisle
(74) *Attorney, Agent, or Firm*—Edward S. Wright

(57) ABSTRACT

Retainer for threaded fasteners such as the cap screws that secure the end caps of roller bearing assemblies to railroad axles. A locking plate is constrained against rotation relative to the fastener, a lock ring having a plurality of openings disposed along a circular path is placed over the head of the fastener, with the fastener being received in a non-circular central opening in the ring and thereby constrained against rotation relative to the ring, and tabs extending from the locking plate and engaging the lock ring through the openings to retain the lock ring on the fastener and prevent the lock ring and fastener from turning. In the disclosed embodiments, the ring can be placed on the fastener in different rotative positions, and the number of tab openings is either a prime number or another number that is not divisible by factors of the number of ring positions, whereby the fastener can be selectively locked in a relatively large number of different positions no more than a few degrees apart.

17 Claims, 3 Drawing Sheets

U.S. PATENT DOCUMENTS

| | | | |
|---|---|---|---|
| 5,692,419 A * | 12/1997 | Binns | 81/124.3 |
| 5,768,999 A | 6/1998 | Edwards | |
| 6,049,138 A * | 4/2000 | Folk | 290/3 |
| 6,257,813 B1 * | 7/2001 | Tanimura | 411/119 |
| 6,371,033 B1 | 4/2002 | Smith et al. | |
| 6,439,616 B1 * | 8/2002 | Karafillis et al. | 285/205 |
| 7,143,700 B2 | 12/2006 | Forbes et al. | |
| 7,174,811 B2 * | 2/2007 | Wright | 81/121.1 |
| 2002/0110437 A1 * | 8/2002 | Kirimoto | 411/119 |
| 2004/0086354 A1 * | 5/2004 | Harris | 411/161 |
| 2004/0096289 A1 * | 5/2004 | Bydalek et al. | 411/161 |
| 2006/0029485 A1 * | 2/2006 | Weinstein | 411/121 |

\* cited by examiner

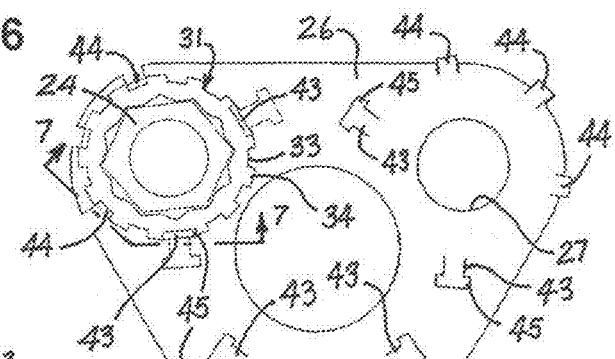
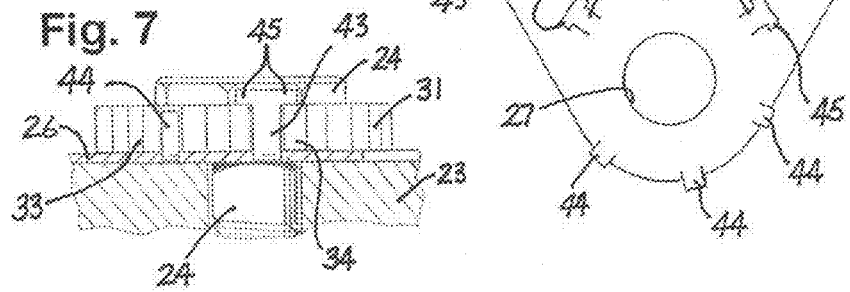
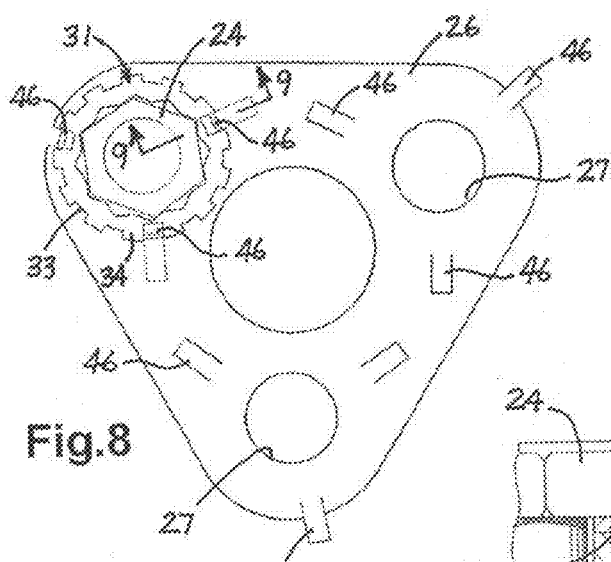

LOCKING RETAINER FOR THREADED FASTENERS

BACKGROUND OF THE INVENTION

1. Field of Invention

This invention pertains generally to threaded fasteners and, more particularly, to a locking retainer for preventing threaded fasteners such as the cap screws which secure the end caps of roller bearing assemblies to the axles of railroad cars from working loose.

2. Related Art

Roller bearing are commonly mounted on the axles which carry the total weight of railroad cars and locomotives, with end caps retaining lubricant and holding the bearings in position on the axles. The end caps are attached to the axles by cap screws which must be tightened to the proper torque and provide adequate clamp load to ensure correct alignment and lubrication of the bearings. Otherwise, the bearings may become damaged, requiring unscheduled maintenance, and in the worst case, cause a derailment.

After the cap screws are tightened to the desired torque, tabs on current locking plates are bent against the heads of the screws to prevent them from working loose and turning. However, the screws can still work loose and turn, especially if the tabs break off or do not squarely engage the flat faces of the screw heads. Moreover, when the screws are turned to bring the flat faces into parallel alignment with the tabs, the screws may exceed the proper torque, which can lead to bearing failure and potential derailment of the train.

OBJECTS AND SUMMARY OF THE INVENTION

It is, in general, an object of the invention to provide a new and improved retainer for threaded fasteners such as the cap screws which secure the end caps of roller bearing assemblies to the axles of railroad cars.

Another object of the invention is to provide a cap screw retainer of the above character which overcomes the limitations and disadvantages of the prior art.

These and other objects are achieved in accordance with the invention by providing a locking plate which is constrained against rotation relative to a threaded fastener, a lock ring having a central opening of non-circular contour in which the fastener is received in non-rotational relationship, a plurality of openings extending along a circular path in the lock ring, and a tab extending from the locking plate through one of the openings to retain the lock ring on the fastener and prevent the lock ring and fastener from turning. In the disclosed embodiments, the rings can be placed on the fasteners in different rotative positions, and the number of tab openings is either a prime number or another number that does not have factors in common with the number of ring positions, which allows the fastener to be locked in a relatively large number of rotative positions which are no more than a degree or two apart.

BRIEF DESCRIPTION OF THE DRAWINGS

FIG. 6 is a side elevational view of another embodiment of a locking plate for a cap screw retainer according to the invention, with one of the cap screws and lock rings in place.

FIG. 7 is an enlarged fragmentary cross-sectional view taken along line 7-7 in FIG. 6.

FIG. 8 is a side elevational view of another embodiment of a locking plate for a cap screw retainer according to the invention, with one of the cap screws and lock rings in place.

FIG. 9 is an enlarged fragmentary cross-sectional view taken along line 9-9 in FIG. 8.

DETAILED DESCRIPTION

Figure 1:
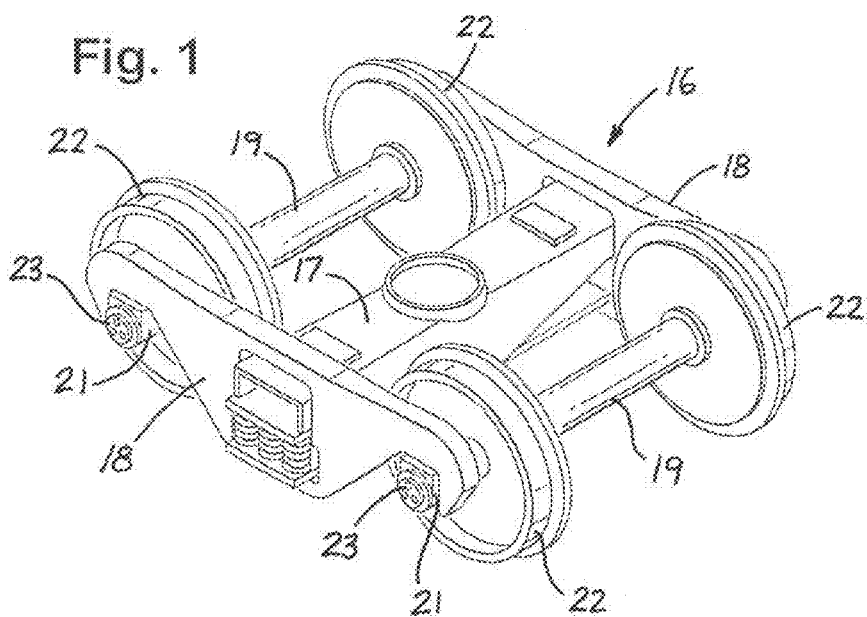
FIG. 1 is an isometric view of a typical embodiment of a railroad truck with a cap screw retainer according to the invention.

In the drawings, the invention is illustrated in conjunction with the truck 16 of a railroad car (not shown) which includes bolster 17 and side frames 18. Axles 19 are rotatively mounted in roller bearing assemblies 21 carried by the side frames, and flanged wheels 22 are mounted on the axles between the frames. The bearing assemblies include end caps 23 which are secured to the ends of the axles by cap screws 24.

Figure 2:
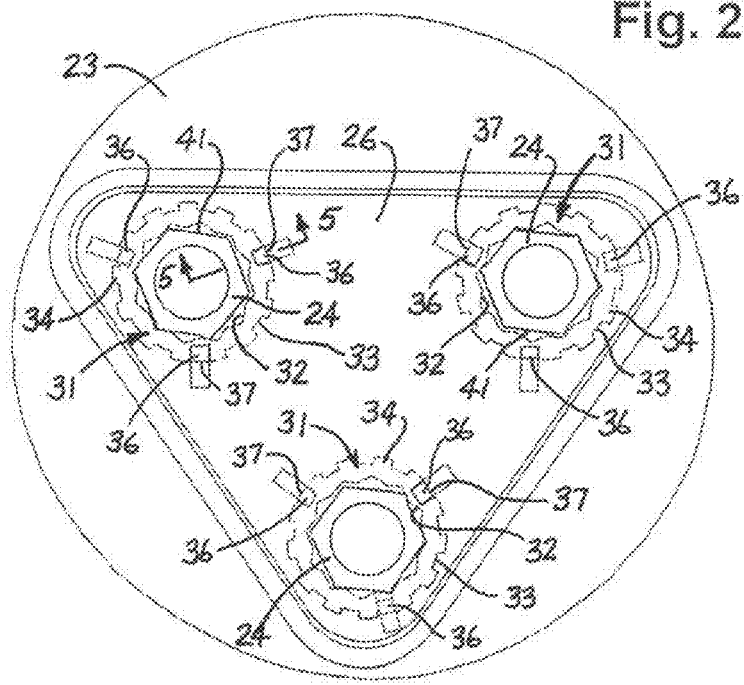
FIG. 2 is a side elevational view of one of the end cap and retainer assemblies in the embodiment of FIG. 1.
Figure 3:
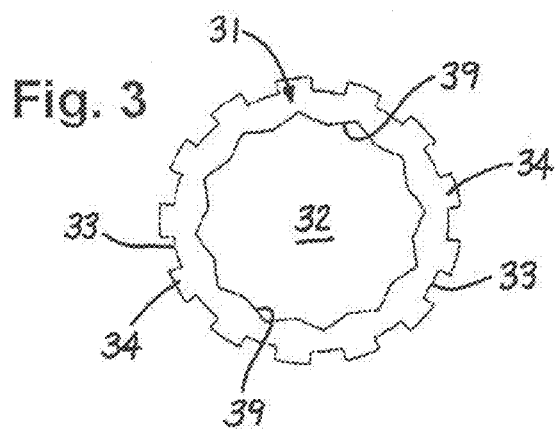
FIG. 3 is a side elevational view of one of the lock rings in the embodiment of FIG. 2.

As best seen in FIG. 2, each of the end caps is secured by three cap screws which are located at the vertices of an equilateral triangle centered about the axle. The shanks of the cap screws pass freely through openings in the end cap and are threaded into the end portion of the axle.

A generally triangular locking plate 26 is mounted on the end cap and held in position by the cap screws. The corners of the plate are rounded, and openings 27 for the shanks of the cap screws extend through the plate near the corners in alignment with the openings in the end caps.

A lock ring 31 is provided for each of the cap screws. Each of these rings has a non-circular central opening 32 and a plurality of openings 33 disposed along a circular path centered about the central opening. In the embodiment illustrated, openings 33 are notches of generally trapezoidal shape which open outwardly through the periphery of the ring, with radially extending teeth 34 between the notches. However, the openings can be of any desired configuration or shape, and they do not have to open through the periphery of the ring.

The lock rings surround the heads of the cap screws, with the walls of the central openings engaging the sides of the heads and preventing the screws from turning within the rings. Tabs 36 extend through openings 33 and engage the lock rings to retain them on the heads of the screws and prevent them and the screws from turning. The tabs are formed integrally with the locking plate by a suitable process such as stamping during the manufacture of the plate and are bent up from the body of the plate to engage the lock rings. In the embodiment illustrated, three lock tabs are provided for each of the cap screws. These tabs are spaced about 120 degrees apart, with two of the tabs on the sides of the ring closest to the other cap screws and the third tab on the side of the ring closest to the corner of the plate.

The tabs are generally rectangular in shape and are bent upwardly along base lines 37 which are generally perpendicular to radii of the openings for the screws. The edges of the tabs engage the side walls of the notches to prevent the rings from turning, and distal end portions of the tabs are bent over the outer faces of the rings to retain the rings on the heads of the screws.

In the embodiment illustrated, the cap screws have hexagonal heads, and the central openings in the retaining rings are 12-point openings with gripping surfaces 39 that engage the flat surfaces 41 on the sides of the heads. Alternatively, if desired, the openings can be 6-pointed or hexagonal, which will provide a better grip on the screws, but will reduce the number of positions in which the rings can be placed on the screw heads and, consequently, the number of positions in which the screws can be locked.

The number of tab holes or notches in the lock rings is preferably a prime number or a number that is not evenly divisible by a factor of the number of positions in which the rings can be placed on the heads of the screws. Thus, for example, with 12-point openings in the rings, the rings can be placed on the screws in twelve different positions, the factors of 12 are 2, 2, and 3, and the number of tab holes is preferably a number that is not divisible by either 2 or 3. With that relationship, the number of positions in which the screws can be locked is the product of the number of ring positions and the number of tab holes. Thus, with a 12-point central opening and 13 tab openings, a screw with a hexagonal head can be locked in any one of 156 positions which are only about 2.2 degrees apart. With 23 tab openings, the same screw can be locked in 276 different positions which are about 1.3 degrees apart. This is an important feature of the invention because it ensures that the cap screws can be locked in position with the proper torque for the bearings.

In use, the tabs are bent up an angle of 90 degrees to the plane of the locking plate, and the locking plate is placed on the end cap and secured with the cap screws. After the cap screws have been tightened to the desired torque, the lock rings are positioned on the screw heads with the screw heads in the central openings and the tabs extending through three of the notches in each of the rings. The distal end portions of the tabs are then bent over the rings, thereby securing the lock rings to the locking plate, with the portions of the tabs in the notches preventing the cap screws form turning and working loose.

Figure 4:
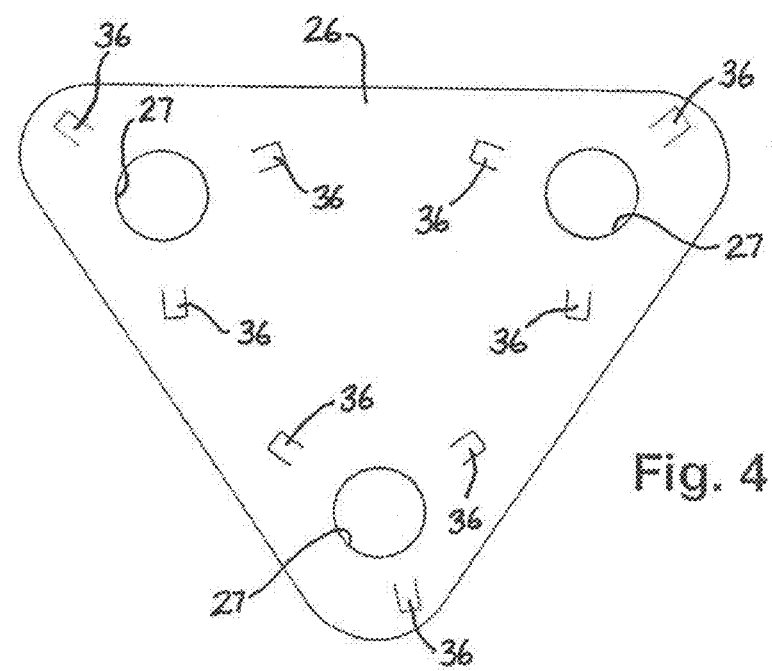
FIG. 4 is a side elevational view of the locking plate in the embodiment of FIG. 2.
Figure 5:
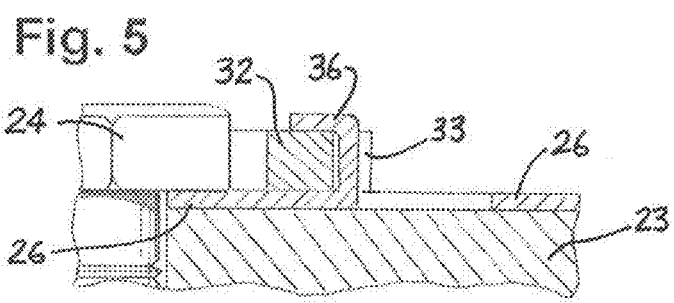
FIG. 5 is an enlarged fragmentary cross-sectional view taken along line 5-5 in FIG. 2.

The embodiments of FIGS. 6-7 and 8-9 are generally similar to the embodiment of FIGS. 4-5, and like reference numerals designate corresponding elements in the three embodiments. In the embodiment of FIGS. 6-7, however, lock rings 31 are secured to locking plate by a combination of generally T-shaped tabs 43 and rectangular tabs 44. As illustrated in FIG. 6, a pair of generally T-shaped tabs are utilized on the sides of the lock rings facing the other cap screws, and three generally rectangular tabs are utilized on the sides of the rings nearest the corners. The generally T-shaped tabs have laterally extending ears 45 that engage the outer surfaces of the lock rings to retain the rings on the cap screws and prevent the lock rings from moving away from the locking plate. The generally rectangular tabs extend through the notches and cooperate with the generally T-shaped tabs in preventing the cap screws from turning and working loose.

In use, generally T-shaped tabs 43 are bent up at an angle of approximately 45 degrees to the locking plate, and generally rectangular tabs are bent up to an angle of 90 degrees. With the cap screws tightened to the desired torque, lock rings 31 are placed on the screw heads, with the generally T-shaped tabs aligned with two of the notches in each ring and the three generally rectangular tabs extending three of the other notches in each ring. The generally T-shaped tabs are then bent up to an angle of 90 degrees so they extend through the notches and the ears on the tabs engage the outer face of the ring adjacent to the notches.

In the embodiment of FIGS. 8-9, the locking plate is fabricated of a material such as spring steel, and lock tabs 46 have hooks or barbs 47 at their outer or distal ends. After the tabs have been bent up and the barbs have been formed, the locking plate is heat treated to make it springy. When the cap screws have been tightened to the desired torque, the lock rings are positioned on the heads of the screws with three of the notches aligned with the tabs. As the rings are pressed onto the heads, the edges at the inner ends of the notches engage the inclined surfaces of the barbs and spread the end portions of the tabs apart. When rings pass the lower or inner ends of the barbs, the tabs spring back toward each other, with the ends of the barbs engaging the outer surfaces of the rings to secure the rings in place.

While the invention has been disclosed with specific reference to cap screws for the end caps of roller bearings on the axles of railroad cars, it can also be used with other threaded fasteners, including nuts as well as other types of bolts.

The invention has a number of important features and advantages. It provides a safe and secure lock that prevents the cap screws for end caps on roller bearing assemblies and other threaded fasteners from working loose, and by permitting the fasteners to be locked in a relatively large number of closely spaced positions, it ensures that the fasteners can be tightened to the proper torque and secured.

It is apparent from the foregoing that a new and improved locking retainer for the cap screws on the end caps on roller bearing assemblies and other threaded fasteners has been provided. While only certain presently preferred embodiments have been described in detail, as will be apparent to those familiar with the art, certain changes and modifications can be made without departing from the scope of the invention as defined by the following claims.

The invention claimed is:

1. A retainer for cap screws that secure an end cap of a roller bearing assembly to a railroad axle, comprising a locking plate with openings through which the shanks of the cap screws pass, lock rings having multi-point central openings and a plurality of outwardly facing notches spaced peripherally about the lock rings, with the heads of the cap screws being received in non-rotational relationship in the central openings, and tabs extending from the locking plate through notches in each of the lock rings and engaging surfaces of the lock rings opposite the locking plate to retain the lock rings on the heads of the cap screws and prevent the lock rings and cap screws from turning.

2. The retainer of claim 1 wherein the cap screws have hexagonal heads, the central openings in the lock rings are 12-point openings, and the number of notches in each of the lock rings is a prime number or a number that is not divisible by 2 or 3.

3. The retainer of claim 1 wherein portions of the tabs are bent over the lock rings to engage the surfaces of the lock rings opposite the locking plate and prevent the lock rings from moving away from the locking plate.

4. The retainer of claim 1 wherein the tabs have laterally extending ears that engage the surfaces of the lock rings opposite the locking plate and prevent the lock rings from moving away from the locking plate.

5. A retainer for a locking fastener having a non-circular peripheral surface, comprising a locking plate constrained against rotation relative to the fastener, a lock ring having a central opening of non-circular contour in which the fastener is received in non-rotational relationship, a plurality of openings extending along a circular path in the lock ring, and a tab extending from the locking plate through one of the openings and engaging a surface of the lock ring opposite the locking plate to retain the lock ring on the fastener and prevent the lock ring and fastener from turning.

6. The retainer of claim 5 wherein the lock ring can be placed on the fastener in a number of different rotational positions.

7. The retainer of claim 5 wherein the number of openings for the tab is a prime number or another number that is not divisible by a factor of the number of positions in which the lock ring can be placed on the fastener.

8. The retainer of claim 5 wherein the peripheral surface of the fastener is hexagonal, and the central opening in the lock ring is a 12-point opening.

9. The retainer of claim 5 wherein the openings for the tab are notches that open outwardly through the periphery of the lock ring.

10. The retainer of claim 5 wherein a portion of the tab is bent over the lock ring to engage the surface of the lock ring opposite the locking plate and prevent the lock ring from moving away from the locking plate.

11. The retainer of claim 5 wherein the tab has laterally extending ears that engage the surface of the lock ring opposite the locking plate and prevent the lock ring from moving away from the locking plate.

12. The retainer of claim 5 wherein the tab is fabricated of a springy material and is biased toward a wall of the opening, with a distal end portion of the tab engaging the surface of the lock ring opposite the locking plate and securing the lock ring to the locking plate.

13. The retainer of claim 5 wherein the locking fastener is a cap screw that secures an end cap of a roller bearing assembly to a railroad axle.

14. A retainer for the cap screws that secure an end cap of a roller bearing assembly to a railroad axle, comprising a generally triangular locking plate with rounded corners and openings near the corners through which the shanks of the cap screws pass, a lock ring having a multi-point central opening and a plurality of outwardly facing peripheral notches disposed about the head of each of the cap screws, with the heads of the cap screws being constrained against rotation by the walls of the central openings, and interlocking tabs which extend from the locking plate through two of the notches in each of the lock rings, engage surfaces of the lock rings opposite the locking plate to retain the lock rings on the heads of the cap screws, and prevent the lock rings and cap screws from turning.

15. The retainer of claim 14 wherein the cap screws have hexagonal heads, the central openings in the lock rings are 12-point openings, and the number of notches in each of the lock rings is a prime number or a number that is not divisible by 2 or 3.

16. The retainer of claim 14 wherein portions of the tabs are bent over the lock rings to engage the surfaces of the lock rings opposite the locking plate and prevent the lock rings from moving away from the locking plate.

17. The retainer of claim 14 wherein the tabs have laterally extending ears that engage the surfaces of the lock rings opposite the locking plate and prevent the lock rings from moving away from the locking plate.

\* \* \* \* \*